United States Patent
Finnerty et al.

(10) Patent No.: US 9,516,474 B2
(45) Date of Patent: Dec. 6, 2016

(54) PASSIVE INDOOR OCCUPANCY DETECTION AND LOCATION TRACKING

(71) Applicant: Siemens Industry, Inc., Alpharetta, GA (US)

(72) Inventors: Shaun Finnerty, Chicago, IL (US); Michael Pawlowski, Bartlett, IL (US); James Friedenberger, Chicago, IL (US); Kerri Devine, Austin, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 36 days.

(21) Appl. No.: 14/616,370

(22) Filed: Feb. 6, 2015

(65) Prior Publication Data

US 2016/0234649 A1    Aug. 11, 2016

(51) Int. Cl.
*H04W 24/00* (2009.01)
*H04W 4/04* (2009.01)
*G01S 1/08* (2006.01)
*H04W 4/00* (2009.01)
*H04W 84/12* (2009.01)
*H04W 84/18* (2009.01)

(52) U.S. Cl.
CPC ............... *H04W 4/04* (2013.01); *G01S 1/08* (2013.01); *H04W 4/008* (2013.01); *H04W 84/12* (2013.01); *H04W 84/18* (2013.01)

(58) Field of Classification Search
CPC ........ H04W 4/008; H04W 84/12; H04W 4/04; G01S 1/08
USPC .............................................. 455/456.1, 41.2
See application file for complete search history.

(56) References Cited

U.S. PATENT DOCUMENTS

| | | | |
|---|---|---|---|
| 8,781,633 B2 * | 7/2014 | Fata | G05B 15/02 700/276 |
| 9,098,279 B2 * | 8/2015 | Mucignat | H04L 12/2825 |
| 2003/0146835 A1 | 8/2003 | Carter | |
| 2008/0056722 A1 | 3/2008 | Hendrix et al. | |
| 2014/0167956 A1 | 6/2014 | Chu | |
| 2015/0018011 A1 | 1/2015 | Mendelson | |
| 2015/0081367 A1 * | 3/2015 | Westlake | G06Q 10/063114 705/7.15 |
| 2015/0195099 A1 * | 7/2015 | Imes | G05B 15/02 700/275 |
| 2015/0338117 A1 * | 11/2015 | Henneberger | F24F 11/00 700/276 |
| 2015/0364017 A1 * | 12/2015 | Hall | G06Q 10/06315 340/539.13 |
| 2016/0078698 A1 * | 3/2016 | Moses | G08B 25/14 340/5.23 |

FOREIGN PATENT DOCUMENTS

WO    2006124327 A2    11/2006

OTHER PUBLICATIONS http://en.wikipedia.org/wiki/IBeacon (Feb. 5, 2015), 5 pages.
International Searching Authority, PCT International Search Report and Written Opinion for PCT/US2016/012451, issued Jun. 17, 2016.

* cited by examiner

*Primary Examiner* — Marceau Milord (57) ABSTRACT

An approach to determine occupancy of a space passively with smart devices, where the smart device detects a beacon associated with a room or area in a building.

18 Claims, 7 Drawing Sheets

```
                    Start
                      |
    ┌─────────────────┴─────────────────┐
    │ Receive a message from a smart device having an encoded
    │ alpha-numeric string associated with a beacon.
    │ 702
    └─────────────────┬─────────────────┘
                      |
    ┌─────────────────┴─────────────────┐
    │ Extract the alpha-numeric string associated with the
    │ beacon.
    │ 704
    └─────────────────┬─────────────────┘
                      |
    ┌─────────────────┴─────────────────┐
    │ Identify the area/room associated with alpha-numeric string
    │ and the user whose device sent the message.
    │ 706
    └─────────────────┬─────────────────┘
                      |
    ┌─────────────────┴─────────────────┐
    │ Optionally exchange additional information with the smart
    │ device.
    │ 708
    └─────────────────┬─────────────────┘
                      |
                     End
```

FIG. 7

PASSIVE INDOOR OCCUPANCY DETECTION AND LOCATION TRACKING

FIELD OF THE INVENTION

This application relates to the field of building systems and, more particularly, to tracking individuals within a building.

BACKGROUND

Building automation systems encompass a wide variety of systems that aid in the monitoring and control of various aspects of building operation. Building automation systems (which may also be referred to herein as "building control systems") include security systems, fire safety systems, lighting systems, and heating, ventilation, and air conditioning ("HVAC") systems. Lighting systems and HVAC systems are sometimes referred to as "environmental control systems" because these systems control the environmental conditions within the building. A single facility may include multiple building automation systems (e.g., a security system, a fire system and an environmental control system). Multiple building automation systems may be arranged separately from one another or as a single system with a plurality of subsystems that are controlled by a common control station or server. The common control station or server may be contained within the building or remote from the building, depending upon the implementation.

The elements of a building automation system may be widely dispersed throughout a facility or campus. For example, an HVAC system includes temperature sensors and ventilation damper controls as well as other elements that are located in virtually every area of a facility or campus. Similarly, a security system may have intrusion detection, motion sensors and alarm actuators dispersed throughout an entire building or campus. Likewise, fire safety systems include smoke alarms and pull stations dispersed throughout the facility or campus. The different areas of a building automation system may have different environmental settings based upon the use and personal likes of people in those areas, such as offices and conference rooms.

Building automation systems typically have one or more centralized control stations in which data from the system may be monitored, and in which various aspects of system operation may be controlled and/or monitored. The control station typically includes a computer or server having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the Apogee® Insight® Workstation, available from Siemens Industry, Inc., Building Technologies Division, of Buffalo Grove, Ill. ("Siemens"), which may be used with the Apogee® building automation system, also available from Siemens. In this system, several control stations connected via an Ethernet or another type of network may be distributed throughout one or more building locations, each having the ability to monitor and control system operation.

The typical building automation system (including those utilizing the Apogee® Insight® Workstation) has a plurality of field panels that are in communication with the central control station. While the central control station is generally used to make modifications and/or changes to one or more of the various components of the building automation system, a field panel may also be operative to allow certain modifications and/or changes to one or more parameters of the system. This typically includes changes to parameters such as temperature and lighting, and/or similar parameters.

The central control station and field panels are in communication with various field devices, otherwise known as "points." Field devices are typically in communication with field panels of building automation systems and are operative to measure, monitor, and/or control various building automation system parameters. Example field devices include lights, thermostats, damper actuators, alarms, HVAC devices, sprinkler systems, speakers, door locks, and numerous other field devices as will be recognized by those of skill in the art. These field devices receive control signals from the central control station and/or field panels. Accordingly, building automation systems are able to control various aspects of building operation by controlling the field devices.

Adjusting the controls of a building and/or area in a building automation system based on users that are present in the building and/or area is desirable. There have been several attempts at determining this but each attempt suffers from a host of problems. For example, using WiFi signals to triangulate user positions relies on infrastructure that is expensive to maintain and is often not maintained by those commissioning the building automation system (BAS). Global positioning system (GPS) signals may be used to determine when a user enters or exits certain geo-fence areas, but because satellite signals are too weak to penetrate buildings, they cannot be used to pinpoint an exact location indoors. GPS is also fairly power intensive, prompting users to disengage if running on a smart device. QR codes associated with specific locations may be scanned by mobile devices which can communicate to a BAS server, but this solution requires explicit user participation. Simple occupancy sensors may be used to identify if people are located in a room or area, but the acquired data is typically limited to being occupied or unoccupied.

Bluetooth® beacon signals have been used to trigger actions in response to an individual smart device's location (either on the individual smart device or a device nearby). Typically such triggered action is for marketing purposes and seeks to make the user aware of some sale or event. The use of such known approaches would not be desirable as a user would not want to be notified every time a building automation system is affected by the user's smart device when in a meeting or conference. Since current Bluetooth beacon applications are directed towards a single user experience, a room with multiple smart devices, where each may indicate a different desired environmental setting requires an approach different from a single user marketing experience.

What is needed in the art is an approach that will identify occupancy of a room or area along with additional data associated with the people present while having minimal impact upon the user.

SUMMARY

In accordance with one embodiment of the disclosure, a passive indoor location tracking approach for building automation systems is provided. Users may be passively tracked in a building or area using an application executed by a processor in a mobile computing device (smart device). The mobile computing device receives a beacon signal broadcast from a beacon located in a room or area serviced by the building automation system. The beacon signal has a beacon code associated with a particular beacon in the building automation system. The mobile computing device communicates with the building automation system and transmits a received beacon code, where the building automation system identifies the location of the mobile computing device based upon knowing what beacon the mobile computing device is near.

The above described features and advantages, as well as others, will become more readily apparent to those of ordinary skill in the art by reference to the following detailed description and accompanying drawings. While it would be desirable to provide an interface system for a building network that provides one or more of these or other advantageous features, the teachings disclosed herein extend to those embodiments which fall within the scope of the appended claims, regardless of whether they accomplish one or more of the above-mentioned advantages.

DESCRIPTION

An example approach for passive indoor occupancy detection and location tracking of people in a building automation system is presented. In the example, a user may have a smart device that receives a beacon signal from one or more of a plurality of beacons that are distributed throughout a building having the building automation system and that transmits a message to a server of the building automation system for occupancy detection and location tracking processing in association with control applications of the building automation system (such as comfort control and energy management of a building room or space). As described in one embodiment, the smart devices communicate with the beacons via Bluetooth® (e.g., a first protocol) and communicate with a BAS server or field panel via WiFi or 3g/4g wireless interface (a second protocol) to transmit a message identifying the detected beacon and the smart device user for occupancy detection and location tracking processing in accordance with the invention.

Figure 1:
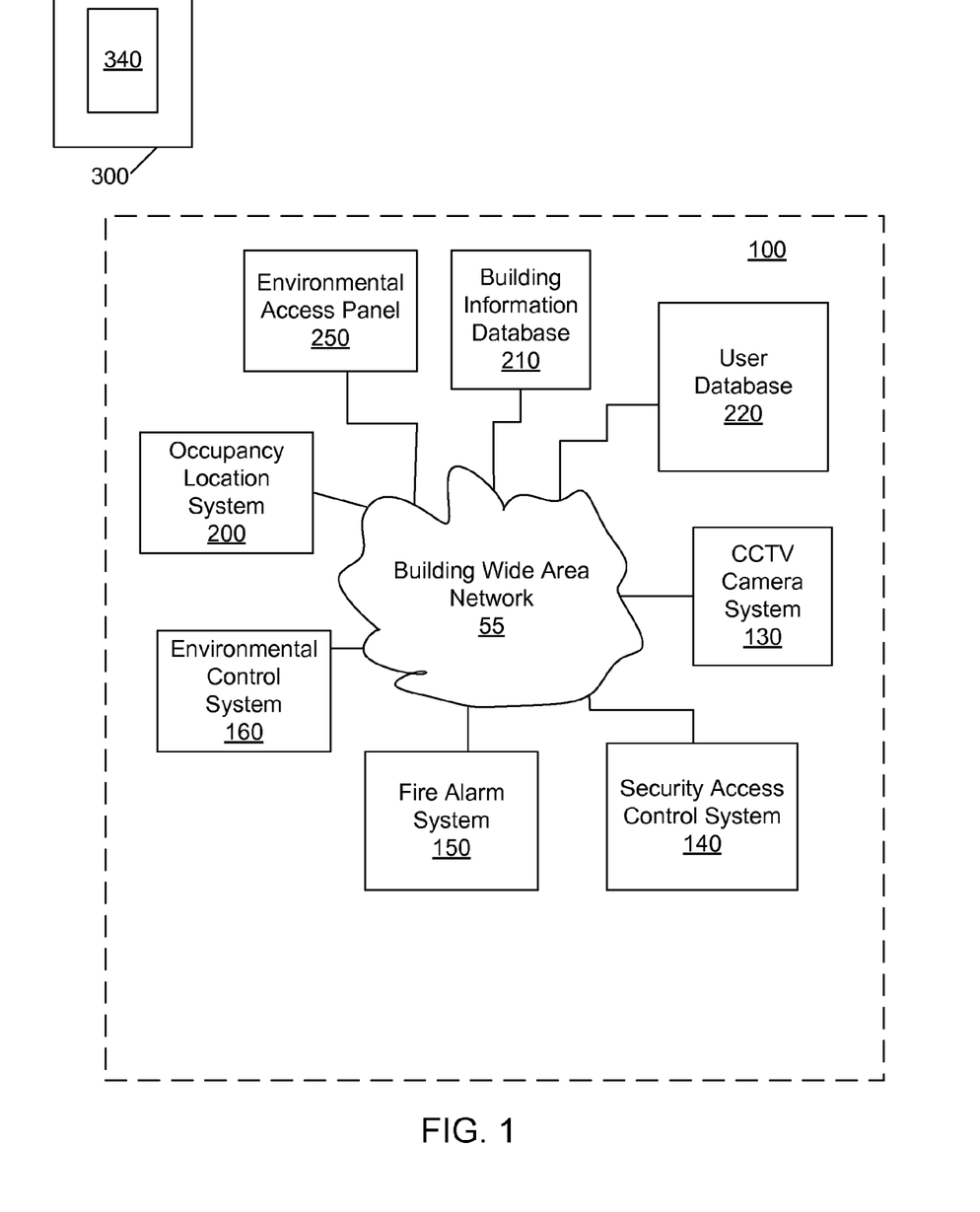
FIG. 1 is an exemplary topology diagram for a building automation system having an environmental control access panel.

With reference to FIG. 1, an exemplary topology diagram for a building automation system approach is shown. The building wide area network 55 may include a plurality of systems and components in wired or wireless communication. The building wide area network 55 may connect a plurality of networked building automation systems (BAS) 100 and may be accessed via an environmental control access panel 250. The BAS 100 further may include access to a data storage device comprising a building information database 210 and a user database 220. Software for communicating environmental and other data to the BAS 100 may be stored on both the mobile computing device 300 (also commonly referred to as a smart device) having a user interface 340 and/or the building automation system 100. As will be explained herein, the occupancy location system (OLS) 200 may enable the BAS 100 to passively acquire user location data along with environmental data associated with the user location data.

In the following pages, the general arrangement of an exemplary building automation system 100 configured for use with the OLS 200 is explained first. Thereafter, the general operation of the mobile computing device 300 with the OLS 200 will be described. Overall operation of the OLS 200 in BAS 100 is discussed following the description of the building automation system (BAS) 100, OLS 200, and the mobile computing device 300.

Building Automation System

Figure 2:
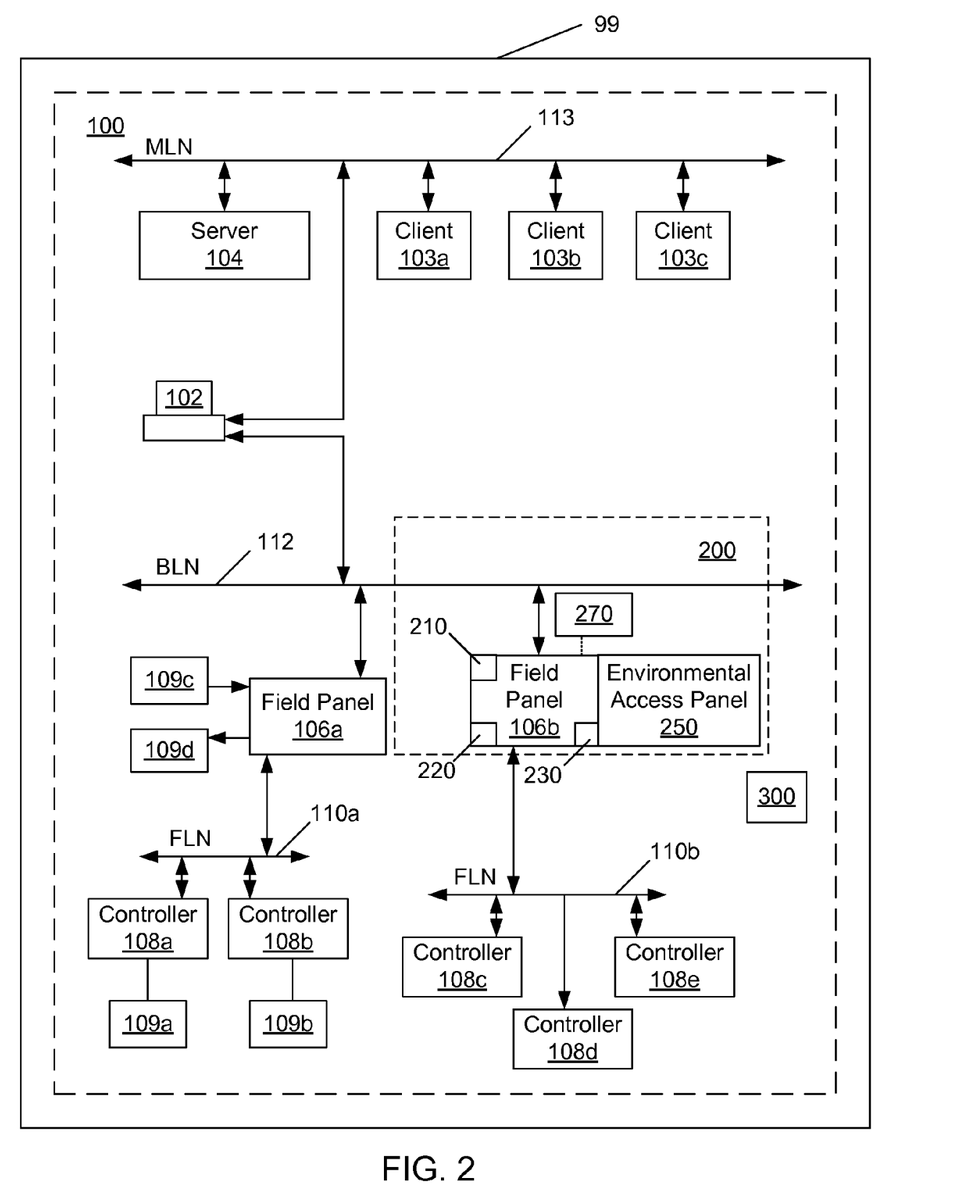
FIG. 2 shows an exemplary block diagram of a building automation system of the building network of FIG. 1.

In the example embodiment of FIG. 1, the building automation system 100 includes a building information database 210, user database 220, closed circuit television system 130, a security system 140, a fire alarm system 150, and an environmental control system 160, environmental access panel 250, and OLS 200 that are coupled together via a building wide area network 55. In FIG. 2, a system block diagram of an exemplary building automation system (BAS) 100 within a building 99 is depicted. The building automation system 100 is depicted as a distributed building system that provides control functions for any one of a plurality of building operations, such as environmental control, security, life or fire safety, industrial control and/or the like. An example of a BAS is the Apogee® building automation system available from Siemens Industry, Inc., Building Technologies Division, of Buffalo Grove, Ill. The Apogee® building automation system allows the setting and/or changing of various controls of the system, generally as provided below. While a brief description of an exemplary BAS is provided in the paragraphs below, it should be appreciated that the building automation system 100 described herein is only an exemplary form or configuration for a building automation system.

With particular reference to FIG. 2, the building automation system 100 includes at least one supervisory control system or workstation 102, client workstations 103a-103c, server 104, a plurality of field panels represented by field panels 106a and 106b, and a plurality of controllers represented by controllers 108a-108e. It will be appreciated, however, that wide varieties of BAS architectures may be employed.

Each of the controllers 108a-108e represents one of a plurality of localized, standard building control subsystems, such as space temperature control subsystems, lighting control subsystems, or the like. Suitable controllers for building control subsystems include, for example, the model TEC (Terminal Equipment Controller) available from Siemens Industry, Inc., Building Technologies Division, of Buffalo Grove, Ill. To carry out control of its associated subsystems, each controller 108a-108e connects to one or more field devices, such as sensors or actuators, shown by way of example in FIG. 2 as the sensor 109a connected to the controller 108a and the actuator 109b connected to controller 108b.

Typically, a controller such as the controller 108a affects control of a subsystem based on sensed conditions and desired set point conditions. The controller controls the operation of one or more field devices to attempt to bring the sensed condition to the desired set point condition. By way of example, consider a temperature control subsystem that is controlled by the controller 108a, where the actuator 109b is connected to an air conditioning damper and the sensor 109a is a room temperature sensor. If the sensed temperature as provided by the sensor 109a is not equal to a desired temperature set point, then the controller 108a may further open or close the air conditioning damper via actuator 109b to attempt to bring the temperature closer to the desired set point. It is noted that in the BAS 100, sensor, actuator and set point information may be shared between controllers' 108a-108e, the field panels 106a and 106b, the work station 102 and any other elements on or connected to the BAS 100.

To facilitate the sharing of such information, groups of subsystems such as those connected to controllers 108a and 108b are typically organized into floor level networks or field level networks ("FLNs") and generally interface to the field panel 106a. The FLN data network 110a is a low-level data network that may suitably employ any suitable proprietary or open protocol. Subsystems 108c, 108d and 108e along with the field panel 106b are similarly connected via another low-level FLN data network 110b. Again, it should be appreciated that wide varieties of FLN architectures may be employed.

The field panels 106a and 106b are also connected via building level network ("BLN") 112 to the supervisory control system/workstation 102 and the server 104. The field panels 106a and 106b thereby coordinate the communication of data and control signals between the subsystems 108a-108e and the supervisory control system/workstation 102 and server 104. In addition, one or more of the field panels 106a, 106b may themselves be in direct communication with and control field devices, such as ventilation damper controllers or the like. To this end, as shown in FIG. 2, the field panel 106a is operably connected to one or more field devices, shown for example as a sensor 109c and an actuator 109d.

The workstation (server in other implementations) 102 provides overall control and monitoring of the BAS 100 and includes a user interface. The workstation 102 further operates as a BAS data server that exchanges data with various elements of the BAS 100. The BAS data server can also exchange data with the server 104. The BAS data server 102 allows access to the BAS system data by various applications. Such applications may be executed on the workstation 102 or other supervisory computers (not shown).

With continued reference to FIG. 2, the workstation 102 is operative to accept modifications, changes, alterations and/or the like from the user. This is typically accomplished via a user interface of the workstation 102. The user interface may include a keyboard, touchscreen, mouse, or other interface components. The workstation 102 is operable to, among other things, affect or change operational data of the field panels 106a, 106b as well as other components of the BAS 100. The field panels 106a and 106b utilize the data and/or instructions from the workstation 102 to provide control of their respective controllers.

The workstation 102 is also operative to poll or query the field panels 106a and 106b for gathering data. The workstation 102 processes the data received from the field panels 106a and 106b, including trending data. Information and/or data is thus gathered from the field panels 106a and 106b in connection with the polling, query or otherwise, which the workstation 102 stores, logs and/or processes for various uses. To this end, the field panels 106a and 106b are operative to accept modifications, changes, alterations and/ or the like from the user.

The workstation 102 also preferably maintains a database associated with each field panel 106a and 106b along with data about the location of beacons 270. The database maintains operational and configuration data for the associated field panel and beacons 270. The server 104 stores historical data, trending data, error data, system configuration data, graphical data and other BAS system information as appropriate.

The management level network (MLN) 113 may connect to other supervisory computers and/or servers, internet gateways, or other network gateways to other external devices, as well as to additional network managers (which in turn connect to more subsystems via additional low level data networks). The workstation 102 may operate as a supervisory computer that uses the MLN 113 to communicate BAS data to and from other elements on the MLN 113. The MLN 113 may suitably comprise an Ethernet or similar wired network and may employ TCP/IP, BACnet, and/or other protocols that support high speed data communications.

FIG. 2 also shows that the BAS 100 may include a field panel 106b that is shown in FIG. 2 as a housing that holds the building information database 210, the user database 220, and the environmental access panel 250 and coupled to one or more beacons 270. As described in further detail herein, the mobile computing device 300 is configured for wireless communications with the beacons via a first peer-to-peer or network type protocol (e.g., Bluetooth®) and the BAS 100 via a second network protocol, such as WiFi, 3G/4G cellular, or Bluetooth®, to give but a few examples.

Figure 3:
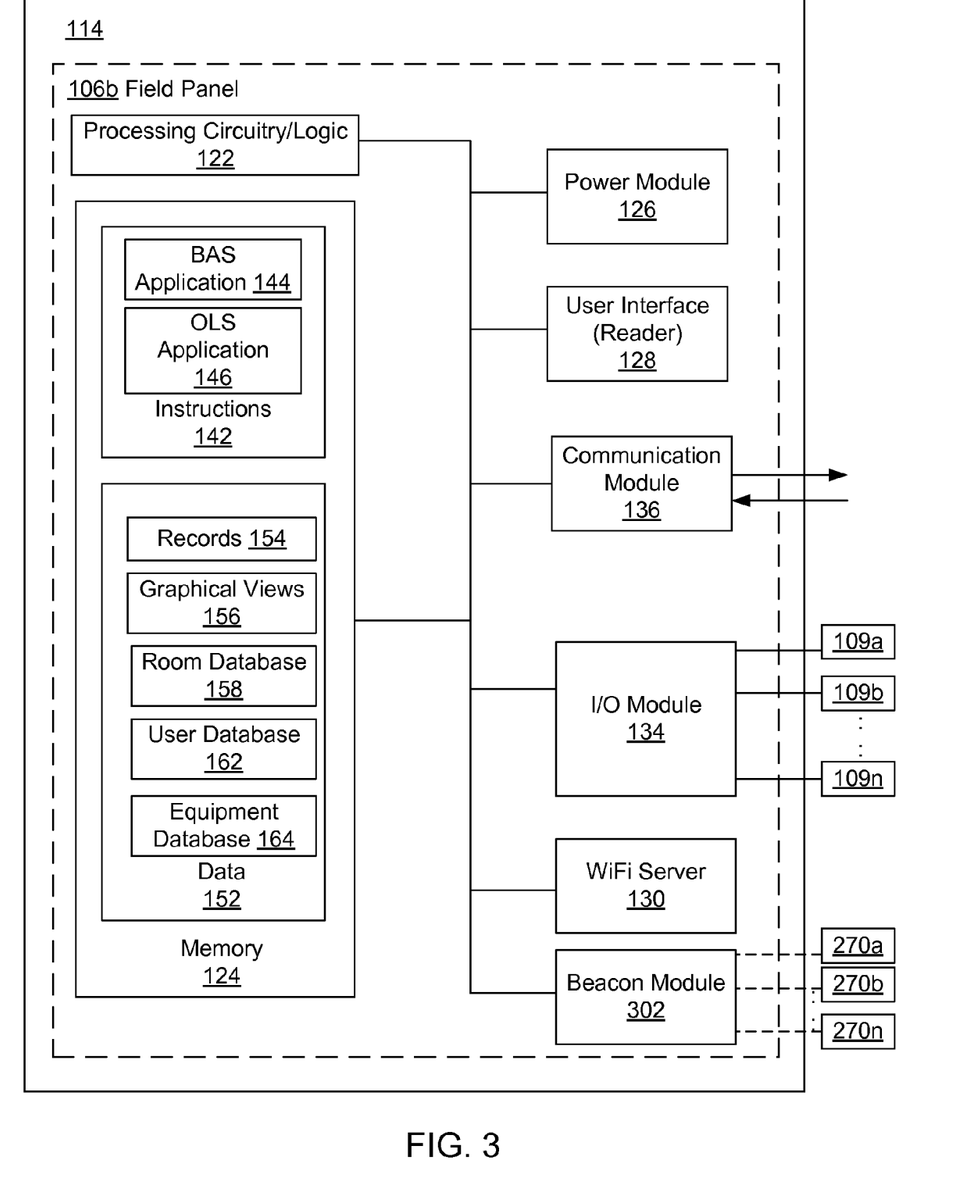
FIG. 3 shows an exemplary internal block diagram of a field panel for the building automation system of FIG. 2 with multiple beacons.

With reference now to FIG. 3, a block diagram of an exemplary embodiment of the field panel 106b of FIG. 2 is shown. It should be appreciated that the embodiment of the field panel 106b is only an exemplary embodiment of a field panel in a BAS 100 with beacons 270. As such, the exemplary embodiment of the field panel 106b of FIG. 3 is a generic representation of all manners or configurations of field panels that are operative in the manner set forth herein.

The field panel 106b of FIG. 3 includes a housing, cabinet or the like 114 that is configured in a typical manner for a building automation system field panel. The field panel 106b includes processing circuitry/logic 122, memory 124, a power module 126, a user interface 128, an I/O module 134, a BAS network communications module 136, WiFi server 130, and beacon module 302.

The processing circuitry/logic 122 is operative, configured and/or adapted to operate the field panel 106b including the features, functionality, characteristics and/or the like as described herein. To this end, the processing circuitry logic 122 is operably connected to all of the elements of the field panel 106a described below. The processing circuitry/logic 122 is typically under the control of program instructions or programming software or firmware contained in the instructions 142 area of memory 124, explained in further detail below. In addition to storing the instructions 142, the memory also stores data 152 for use by the BAS 100.

The field panel 106b also includes a power module 126 that is operative, adapted and/or configured to supply appropriate electricity to the field panel 106b (i.e., the various components of the field panel). The power module 126 may operate on standard 120 volt AC electricity, but may alternatively operate on other AC voltages or include DC power supplied by a battery or batteries.

An input/output (I/O) module 134 is also provided in the field panel 106b. The I/O module 134 includes one or more input/output circuits that communicate directly with terminal control system devices such as actuators and sensors. Thus, for example, the I/O module 134 includes analog input circuitry for receiving analog sensor signals from the sensor 109a, and includes analog output circuitry for providing analog actuator signals to the actuator 109b. The I/O module 134 typically includes several of such input and output circuits.

The field panel 106b further includes a BAS network communication module 136. The network communication module 136 allows for communication to the controllers 108c and 108e as well as other components on the FLN 110b, and furthermore allows for communication with the workstation 102, other field panels (e.g., field panel 106a) and other components on the BLN 112. To this end, the BAS network communication module 136 includes a first port (which may suitably be a RS-485 standard port circuit) that is connected to the FLN 110b, and a second port (which may also be an RS-485 standard port circuit) that is connected to the BLN 112.

The field panel 106b may be accessed locally. To facilitate local access, the field panel 106b includes an interactive user interface 128. Using user interface 128, the user may control the collection of data from devices such as sensor 109a and actuator 109b. The user interface 128 of the field panel 106b includes devices that display data and receive input data. These devices may be devices that are permanently affixed to the field panel 106b or portable and moveable. The user interface 128 may also suitably include an LCD type screen or the like, and a keypad. The user interface 128 is operative, configured and/or adapted to both alter and show information regarding the field panel 106b, such as status information, and/or other data pertaining to the operation, function and/or modifications or changes to the field panel 106b.

As mentioned above, the memory 124 includes various programs that may be executed by the processing circuitry/logic 122. In particular, the memory 124 of FIG. 3 includes a BAS application 144 and OLS application 146. The BAS application 144 includes conventional applications configured to control the field panel 106b of the BAS 100 in order to control and monitor various field devices 109a-n of the BAS 100. Accordingly, execution of the BAS application 144 by the processing circuitry/logic 122 results in control signals being sent to the field devices 109a-n via the I/O module 134 of the field panel 106b. Execution of the BAS application 144 also results in the processor 122 receiving status signals and other data signals from various field devices 109a-n, and storage of associated data in the memory 124. In one embodiment, the BAS application 144 may be provided by the Apogee® Insight® BAS control software commercially available from Siemens Industry, Inc. or another BAS control software.

In addition to the instructions 142, the memory 124 may also include data 152. The data 152 include records 154, graphical views 156, a room database 158, a user database 162, and an equipment database 164. The records 154 include current and historical data stored by the field panel 106b in association with control and operation of the field devices 109a-n. For example, the records 154 may include current and historical temperature information in a particular room of the building 99, as provided by a thermistor or other temperature sensor within the room. The records 154 in the memory may also include various set points and control data for the field devices 109, which may be pre-installed in memory 124 or provided by the user through the user interface 128. The records 154 may also include other information related to the control and operation of the 100 BAS and OLS application 146, including statistical, logging, licensing, and historical information.

In one embodiment, the beacon module 302 may be coupled to one or more beacons 270a-270n as reflected in dash lines in FIG. 3. In this embodiment, the OLS application 146 via the beacon module 302 communicates with the beacons 270a-270n and configures the data that is transmitted by the respective beacon. The OLS application 146 via the beacon module 302 may also verify the operation of the beacons via periodic pinging of the beacon. If an error is detected in the operation of the beacon, a fault indication may be generated and reported via the server 104. The identification of each beacon 270 (the "beacon identifier") and the location of each beacon 270 may be automatically configured using the room database 158 and equipment database 164 located in memory 124. In other configurations, each beacon 270 may be manually configured and the respective beacon identifier and location stored in the equipment data base 164 and room database 158. In yet another implementation, each beacon 270 may be manually configured or downloaded with data that is repeatedly transmitted independently of the field panel 106b and manually configured in the building information database 210. In either manual configuration, the respective beacon 270 may be independent from the BAS 100 with only information associated with the respective beacon (i.e., beacon identifier and location) stored in the BAS database (i.e., beacon 270A of FIG. 4 without network interface 404). It is also possible in some implementations that beacons 270 may be collocated with other devices, such as smoke detectors, temperature monitors, or other BAS sensors or devices. While the field panel 106b has been explained in the foregoing embodiment, it will be recognized that these components may be retained in other locations in association with the BAS 100.

Figure 4:
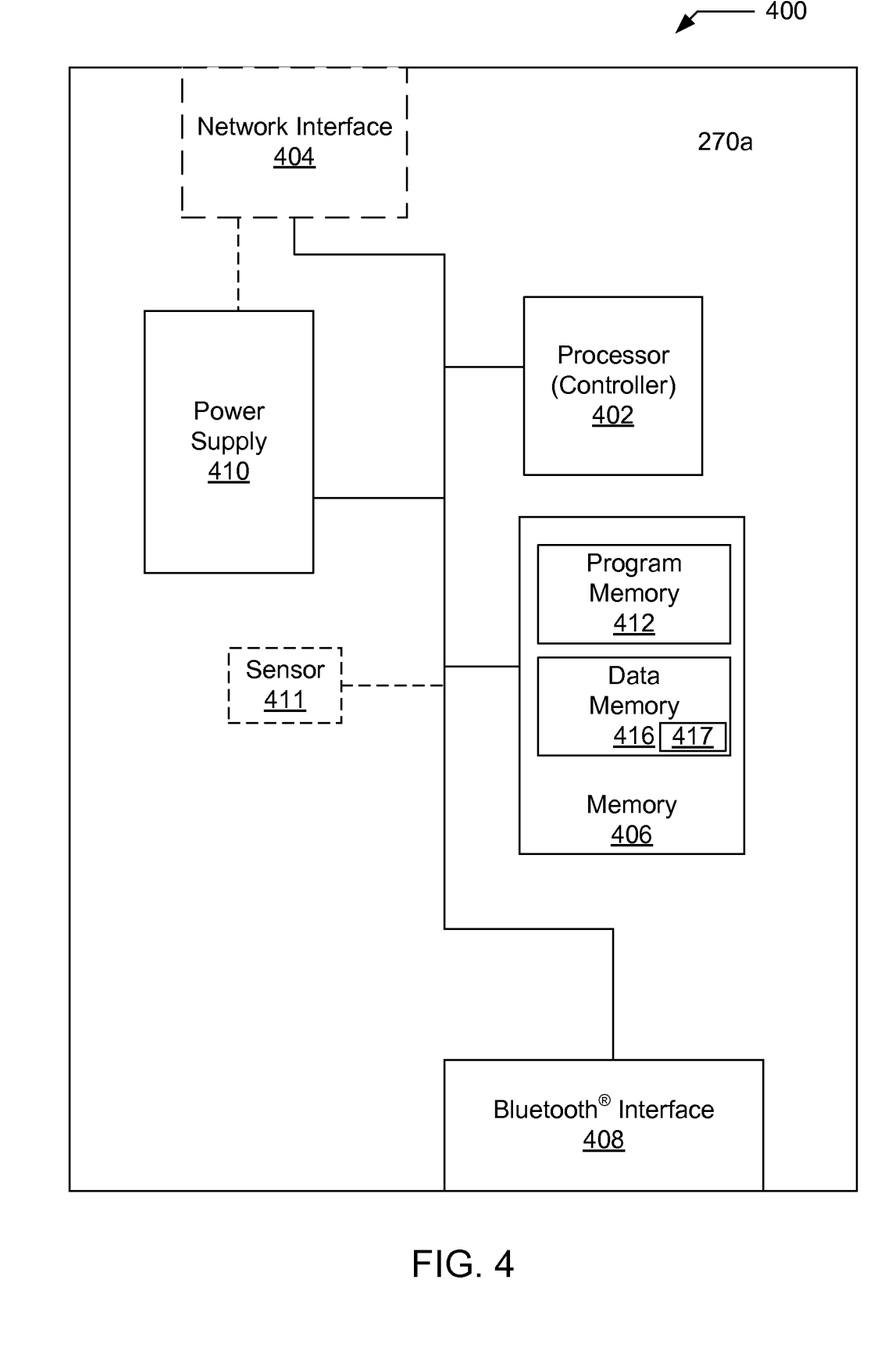
FIG. 4 depicts an exemplary block diagram of a beacon of FIG. 3 in accordance with an example implementation.

Turning to FIG. 4, an exemplary block diagram 400 of a beacon 270a in accordance with an example implementation is depicted. The beacon 270a may have a processor 402 coupled to a network interface 404 (network transmitter/receiver), memory 406 and Bluetooth® interface 408. The processor 402 may be a microprocessor, digital signal processor, application specific integrated circuit (ASIC), and/or microcontroller. The memory 406 may be further divided into program memory 412 and data memory 416. In some implementations, a sensor 411 may be coupled to the processor 402 and provide additional information via the Bluetooth® Interface 408, such as temperature, humidity, amount of illumination, etc. . . . . The processor may execute machine readable instructions stored in program memory 412 that enables communication via network interface 404 with the BAS 100 (field panel 106b). The processor may also execute instructions from program memory 412 and data memory 416 that results in the Bluetooth® interface 408 to continuously transmits/broadcasts predetermined data (beacon identifier 417) in a wireless beacon signal (also referenced herein as "beacon transmission"). The Bluetooth® interface 408 may implement the Bluetooth® 4.0 version of Bluetooth®. The power supply 410 may be power-over-Ethernet if network interface 404 is a power-over-Ethernet interface and is present. If the beacon 270A is a stand-alone device, then power supply 410 may be a battery. The data may be transmitted in a continuous beacon signal stream or periodically transmitted beacon signal. The data that is typically transmitted by the beacon 270A is an alpha-numeric string that is able to be derived from the beacon signal received by any Bluetooth® device, even if that device is not specifically paired with the receiving device. The alpha-numeric string that corresponds to or defines a respective beacon identifier is stored in association with a building location of the respective beacon in the building information database 210.

Mobile Computing Device

Figure 5:
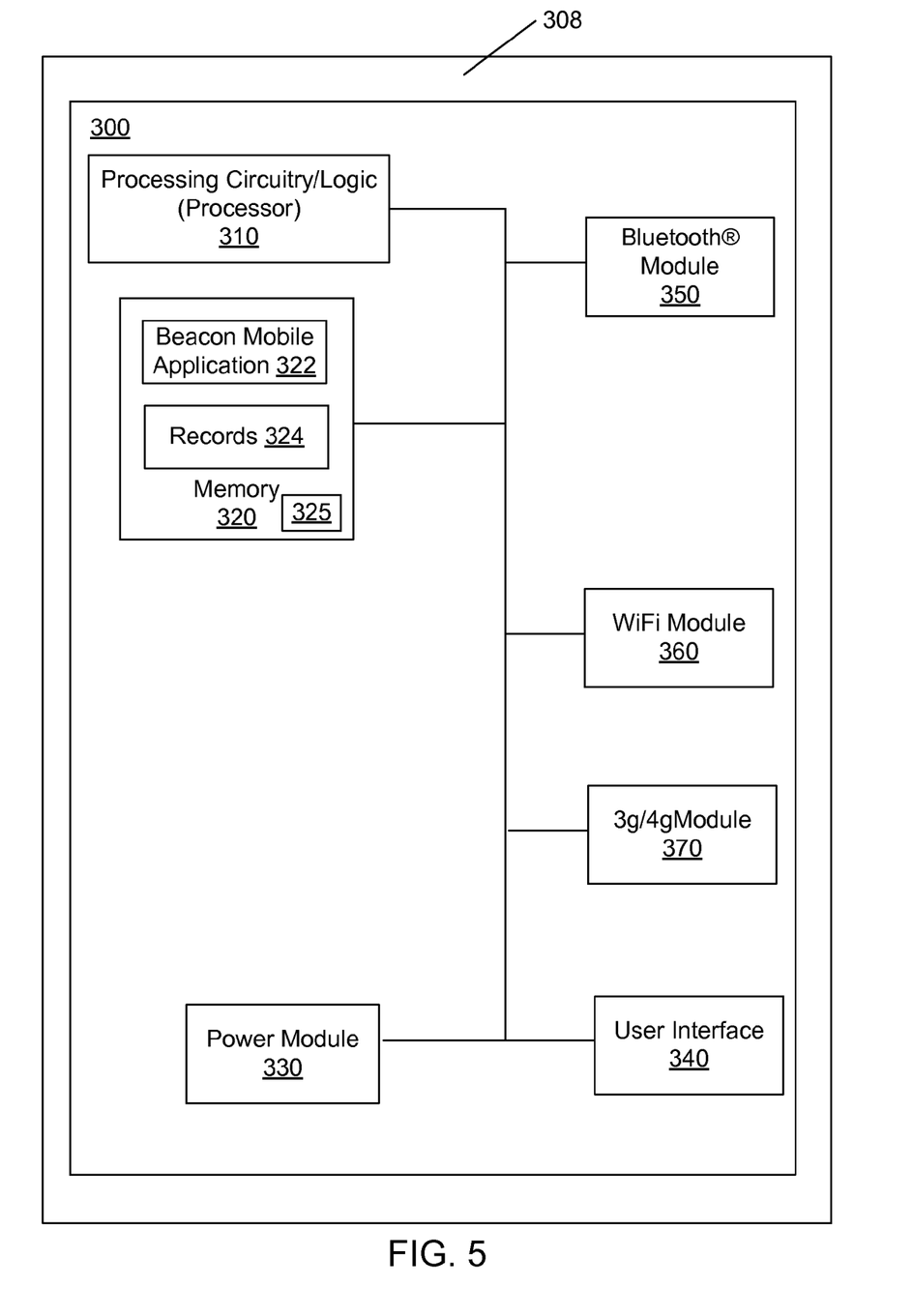
FIG. 5 shows an internal block diagram of an exemplary mobile computing device 300 of FIG. 1.

A mobile computing device may be provided by any mobile or smart device capable of being carried by a human, and receiving the beacon signal and transmitting a second signal to the BAS 100. With reference now to FIG. 5, an internal block diagram of an exemplary mobile computing or smart device 300 is shown. The mobile computing device 300 includes a Bluetooth® module 350 that is able to receive the beacon transmission from a beacon, such as beacon 270a. It is preferred that the device is Bluetooth 4.0 enabled due to the low energy benefits of this version of Bluetooth®. Exemplary mobile computing devices include personal digital assistants, smart phones, and handheld personal computers (e.g., Droid®, iOS iPhone®, iPod®, iPod Touch®, iPad®, etc.).

The mobile computing device 300 of FIG. 5 includes a housing, case or the like 308 that is configured in a typical manner for a mobile computing device. The mobile computing device 300 includes processing circuitry/logic 310, a memory 320, a power module 330, a user interface 340, Bluetooth® module 350, WiFi module 360, and 3g/4g module 370 all positioned within the housing 308. It will be appreciated by one having ordinary skill in the art that the embodiment of the mobile computing device 300 is only an exemplary embodiment of a mobile computing device configured for communication with the BAS 100 over a wireless network and may include other components not shown to avoid obscuring aspects of the present invention.

The processing circuitry/logic 310 is operative, configured and/or adapted to operate the mobile computing device 300 including the features, functionality, characteristics and/or the like as described herein. To this end, the processing circuitry/logic 310 is coupled to the elements of the mobile computing device 300 described below. The processing circuitry/logic 310 is typically under the control of program instructions or programming software or firmware for applications, such as beacon mobile application 322 contained in memory 320, explained in further detail below. In addition to storing the program instructions, the memory 320 also stores data 324 and message formats 325 for use communicating with the BAS 100.

The mobile computing device 300 also includes a power module 330 that is operative, adapted and/or configured to supply appropriate electricity to the mobile computing device 300 (i.e., the various components of the mobile computing device). The power module 330 is generally DC power supplied by a battery or batteries.

The mobile computing device 300 further includes a user interface 340. The user interface 340 allows the mobile computing device 300 to present information to the user, and also allows the user to insert data into the mobile computing device 300. Accordingly, the user interface 340 may be configured to drive a touchscreen, keypad, buttons, speaker, microphone, or any of various other standard user interface devices.

A Bluetooth® module 350 may also be provided in the mobile computing device 300. The Bluetooth® module 350 may be configured by software or an application to receive and transmit Bluetooth® encoded data. Bluetooth® is the standard communication protocol with the Bluetooth® Core Specification version 4.0 (called Bluetooth® Smart) and has been adopted as of 30 Jun. 2010. It includes Classic Bluetooth®, Bluetooth® high speed, and Bluetooth® low energy protocols. Bluetooth® high speed is based on Wi-Fi, and Classic Bluetooth® consists of legacy Bluetooth® protocols. The memory 320 includes various programs that may be executed by the processing circuitry/logic 310 (which may include a processor). In particular, the memory 320 in the mobile communications device 300 of FIG. 5 includes a beacon mobile application 322. The beacon mobile application 322 may be configured to facilitate receiving a beacon signal and associated data via the Bluetooth® module 350 and transmitting data to the BAS 100 via a Wi-Fi network connection. A user's smart device/mobile computing device 300 need not be previously identified to the BAS 100 or the OLS 200. A user may obtain the beacon mobile application 322 via a corresponding mobile application electronic store or locally where it is made available by the BAS 100 owner or operator.

Operation of the beacon mobile application 322 will be explained in further detail below.

In addition to the instructions of beacon mobile application 322, the memory 320 of the mobile computing device 300 also includes data. The data may include records 324 of current and historical data related to operation of the mobile computing device 300. For example, the records 324 may include user identification information that identifies the mobile computing device 300. The records 324 may also include current and historical beacon data received at the mobile computing device 300.

Beacon Mobile Application Operation

Figure 6:
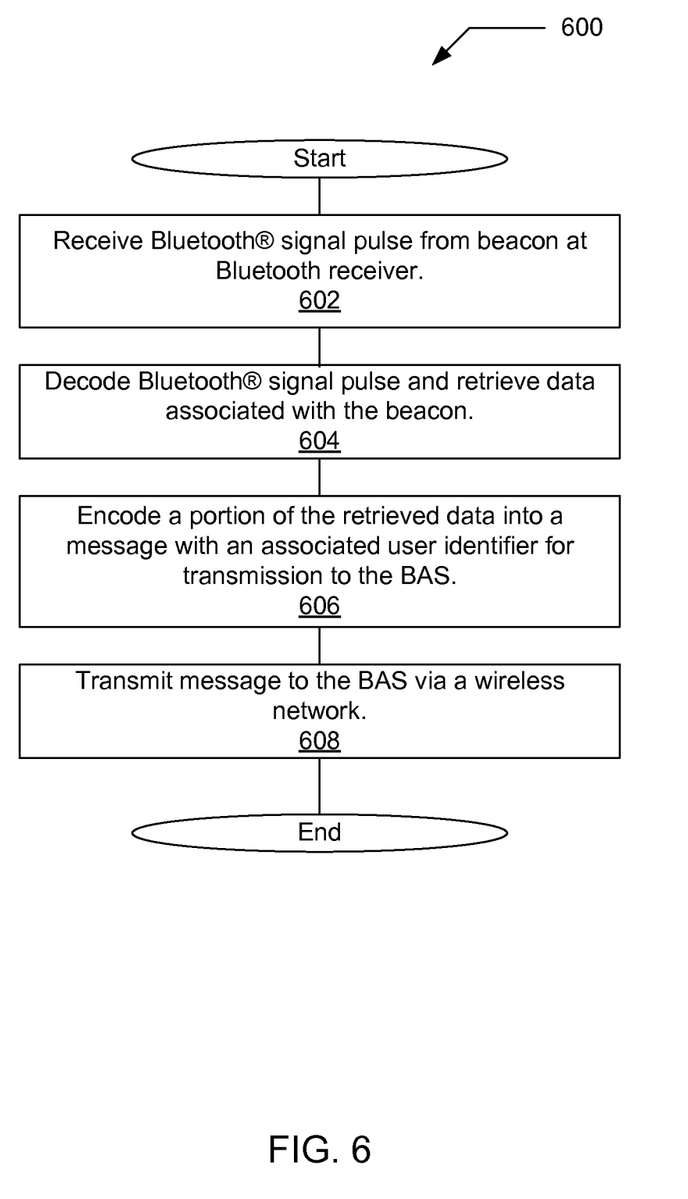
FIG. 6 illustrates a flow diagram of the operation of the beacon mobile application on the mobile computing device of FIG. 5.

With reference now to FIG. 6, a flow diagram 600 of the operation of the beacon mobile application 322, FIG. 5, is depicted. The Bluetooth® receiver located in the Bluetooth™ module 350 receives the beacon signal from the beacon in step 602 when the smart device having the Beacon Mobile App is carried within a pre-determined transmission range of a respective beacon 270 in the building under the control of the BAS 100. The beacon signal pulse contains an alpha-numeric string. The Bluetooth® signal pulse associated with the beacon is decoded and the alpha-numeric string is extracted in step 604. The smart device 300 encodes a message 325 containing the alpha-numeric string that corresponds to or includes the beacon identifier 417 (that may be stored in memory 320) along with a user identifier in a format that may be transmitted to the BAS 100 in step 606. In step 608, the encoded message is transmitted to the BAS 100 using a transmitter over a wireless network. For example, the transmission may be via a WiFi network or 3g/4g networks. The beacon mobile application 322 may run in the background on the smart device 300. The transmission of the alpha-numeric string from the smart device 300 to the BAS 100 may occur periodically, such as when a new beacon's alpha-numeric number has been received via a beacon signal and decoded at smart device 300. The OLS 200 receives the beacon identification and user identification from the smart device 300. The OLS 200 is able to determine more than one device associated with the same user has transmitted the beacon identifier 417 and track/record the user being in the location associated with the beacon identifier.

Figure 7:
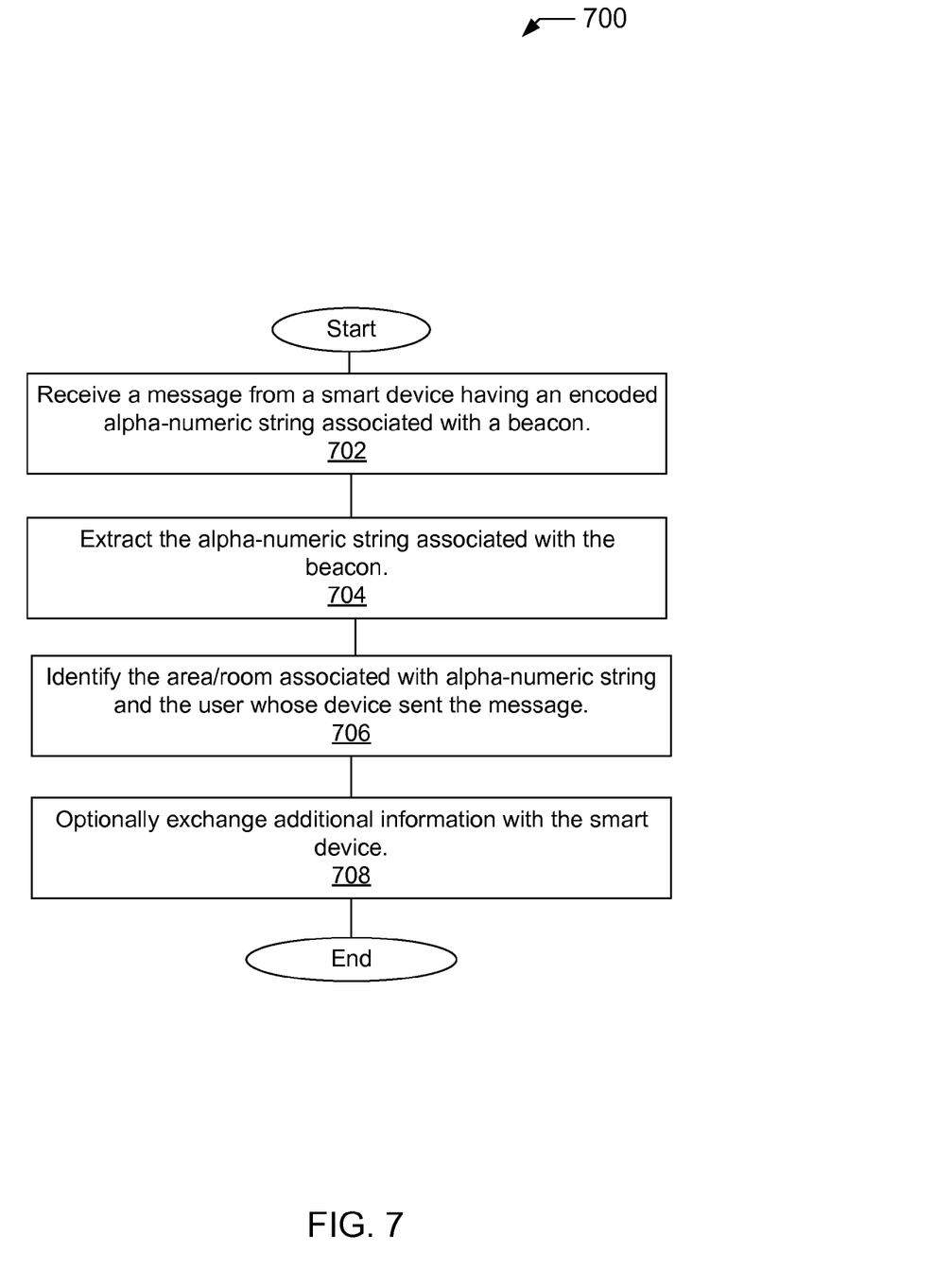
FIG. 7 illustrates a flow diagram of the operation of the server in receipt of a message from the mobile computing device of FIG. 5 having an encoded alpha-numeric string associated with the beacon of FIG. 3.

Turning to FIG. 7, a flow diagram 700 of the operation of the server 104 in receipt of a message having an encoded alpha-numeric string associated with the beacon is depicted. The server 104 receives a message from mobile computing device 300 (commonly referred to as a "smart device"), where the message includes an encoded alpha-numeric string associated with the beacon in step 702. The alpha-numeric string associated with the beacon is extracted from the message received from the beacon in step 704. The server then accesses the building information database 210 using the alpha-numeric string to identify the location (room or area) of the beacon in step 706. The message from the smart device 300 to the server 104 may also contain user information that identifies the smart device 300 and an associated user identity that may be stored in the user database 220.

The location of the beacon 270 and user information may be accessed/looked up in separate database (210 and 220) or in other implementations may have one or more lookup tables (as shown in Table 1) or other data structures. The database or table may be accessed in order to identify the beacon location and smart device user. In other implementations, additional information may be exchanged between the server 104 and smart device 300 associated with the location of the smart device 300 in step 708. In other implementations, additional information such as temperature, amount of light and/or sound in the room or area, or information stored in the beacon mobile application 322 on the smart device 300 may also be passed to the server 104 along with the alpha-numeric string associated with the beacon.

One or more databases or other data structures may be used to associate or group rooms, beacons and users in the OLS system 200. In Table 1, an example table that contains a list of locations, beacons, and users currently in those locations is depicted. More than one beacon may be employed to cover a room or area in a building. As users' identifications and associated beacon identifiers 417 are received at the OLS 200, users may be associated with a location in the data structure or database. Thus, the occupancy of a room or area is identifiable as is the location of users.

TABLE 1

| Location | Beacon | Users |
| --- | --- | --- |
| Building 100 - Room A | 2342asdf | Eng1001 |
|  | 2532adaa | Eng1016 |
|  |  | Admin002 |
| Building 100 - Room B | 3235dfad |  |
| Building 200 - Room A | 34fd3442 | Admin006 |

Occupancy Location System

In operation the OLS 200 has a server 106b that receives information from multiple smart devices 300 that are running the beacon mobile application directly or via communication received from field panel 106b. In other implementations, the server may reside in a central server, such as 104 that supports at least one BAS 100. With multiple beacons placed throughout an area or building transmitting their alpha-numeric strings (beacon identifiers) that are received by smart devices, the location of each smart device may be identified along with associated users. The information may be used by the BAS to make adjustments to the systems based upon occupancy, such as adjusting the HVAC systems based upon the number of people in the room where the beacon identifier(s) were received & transmitted by the respective smart devices, such as smart device 300, carried by each person and adjusting security systems based upon location of people in the building. Types of adjustments that may be made include; air treatment (heat or air conditioning, air movement, humidity) and lighting. Thus, the identification of multiple smart devices with a beacon identifier is used to adjust a BAS, rather than an individual smart device triggering content on that device or a local device close to the smart device.

The foregoing detailed description of one or more embodiments of the passive indoor location tracking approach has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An occupancy location system, comprising: a beacon having a transmitter that transmits a beacon signal having a beacon identifier, where the beacon signal is a first protocol signal; a processor in a smart device in communication with a first receiver that receives the beacon signal that includes the associated beacon identifier, and incorporates a smart device identification and the beacon identifier in a message; a transmitter coupled to the processor that formats the message for transmission to a server, where the beacon identifier is associated with an area within a building automation system (BAS); a receiver in the building automation system (BAS) that receives the message, where the message is encoded in a second protocol signal; and the server that is coupled to the receiver and a database in the BAS that identifies a user location by accessing the database with the beacon identifier and the smart device identification, wherein the server adjusts at least one parameter associated with the BAS in response to the user location, where the at least one parameter is a parameter associated with air conditioning.

2. The occupancy location system of claim 1, wherein the first receiver is a Bluetooth® receiver.

3. The occupancy location system of claim 1, where the beacon identifier is a plurality of alpha-numeric characters.

4. An occupancy location system, comprising: a beacon including: a controller; a transmitter coupled to the controller, wherein the transmitter transmits a beacon signal with an associated beacon identifier, where the beacon signal is a first protocol signal; and a sensor coupled with the transmitter and the controller in a building automation system (BAS); a receiver in the building automation system (BAS) that receives a message from a smart device, where the message is encoded in a second protocol signal and includes the beacon identifier and a user identifier; a server that is coupled to the receiver and a database in the BAS that identifies a user location by accessing the database with the beacon identifier and the user identifier; wherein the server adjusts at least one parameter associated with the BAS in response to the user location, where the at least one parameter is a parameter associated with air conditioning.

5. The occupancy location device of claim 4, where the transmitter is a Bluetooth® transmitter.

6. A system of occupancy location determination, comprising: a beacon having a transmitter that transmits a beacon signal having a beacon identifier, where the beacon signal is a first protocol signal; a receiver in a building automation system (BAS) that receives the beacon identifier and a user identifier in a message from a smart device that is encoded in a second protocol signal; and a controller that is coupled to the receiver and a database in the BAS that identifies the user location by accessing the database with the beacon identifier and the user identifier, wherein the controller adjusts at least one parameter associated with the BAS in response to the user location, where the at least one parameter includes a parameter associated with air conditioning.

7. The system of claim 6, where the first protocol signal is a Bluetooth® signal.

8. The system of claim 6, where the second protocol signal is a WiFi signal.

9. The system of claim 6, where the beacon identifier is an alpha-numeric string.

10. The system of claim 6, where the beacon is coupled to the BAS by a network interface.

11. The system of claim 6, wherein the network interface provides power for the beacon.

12. The system of claim 6, where the at least one parameter includes a parameter associated with lighting.

13. A method of occupancy location determination, comprising: transmitting at a beacon by a transmitter a beacon signal having a beacon identifier, where the beacon signal is a first protocol signal; receiving at a receiver in a building automation system (BAS) the beacon identifier and a user identifier in a message from a smart device that is encoded in a second protocol signal; identifying the user location in the BAS with a controller that is coupled to the receiver and a database by accessing the database with the beacon identifier and the user identifier; and adjusting with the controller at least one parameter associated with the BAS in response to the user location, where the at least one parameter includes a parameter associated with air conditioning.

14. The method of claim 13, where the transmitting of the first protocol signal is transmitting a Bluetooth® signal.

15. The method of claim 13, where receiving the second protocol signal is receiving a WiFi signal.

16. The method of claim 13, where the at least one parameter includes a parameter associated with lighting.

17. The method of claim 13, where the beacon is coupled to the BAS by a network interface.

18. The method of claim 17, including receiving power via the network interface at the beacon.

\* \* \* \* \*